US012583406B2

(12) United States Patent
Yamamoto

(10) Patent No.: US 12,583,406 B2
(45) Date of Patent: Mar. 24, 2026

(54) VEHICLE STRUCTURAL MEMBER

(71) Applicant: TOYODA IRON WORKS CO., LTD.,
Toyota (JP)

(72) Inventor: Akiyoshi Yamamoto, Toyota (JP)

(73) Assignee: TOYODA IRON WORKS CO., LTD.,
Toyota (JP)

( * ) Notice: Subject to any disclaimer, the term of this
patent is extended or adjusted under 35
U.S.C. 154(b) by 422 days.

(21) Appl. No.: 18/041,404

(22) PCT Filed: Aug. 10, 2021

(86) PCT No.: PCT/JP2021/029507
§ 371 (c)(1),
(2) Date: Feb. 10, 2023

(87) PCT Pub. No.: WO2022/034878
PCT Pub. Date: Feb. 17, 2022

(65) Prior Publication Data
US 2023/0294625 A1 Sep. 21, 2023

(30) Foreign Application Priority Data
Aug. 11, 2020 (JP) ................................. 2020-135609

(51) Int. Cl.
*B60R 19/18* (2006.01)
(52) U.S. Cl.
CPC ...... *B60R 19/18* (2013.01); *B60R 2019/1806* (2013.01)
(58) Field of Classification Search
CPC ........... B60R 19/18; B60R 2019/1806; B60R 2019/1813; B60R 2019/182; B60R 2019/1826; B60R 19/1833; B62D 25/02; B60J 5/0444

USPC ................................................... 293/102, 120
See application file for complete search history.

(56) References Cited

U.S. PATENT DOCUMENTS

| | | | |
|---|---|---|---|
| 8,419,090 B2 | 4/2013 | Nojima et al. | |
| 2009/0066095 A1 | 3/2009 | Karlander | |
| 2014/0001788 A1* | 1/2014 | Ito | B60J 5/0429 296/146.6 |
| 2017/0113725 A1 | 4/2017 | Kamiya | |

(Continued)

FOREIGN PATENT DOCUMENTS

| | | |
|---|---|---|
| JP | 2008-265738 A | 11/2008 |
| JP | 2008-542094 A | 11/2008 |

(Continued)

OTHER PUBLICATIONS

Translation.*

(Continued)

*Primary Examiner* — Amy R Weisberg
*Assistant Examiner* — Denise L. Esquivel

(57) ABSTRACT

A press-formed vehicle structural member includes: a top wall; a pair of lateral walls extending from opposite edges of the top wall in a broadening manner; and a pair of flanges bending outwardly from edges of the lateral walls, wherein the vehicle structural member has a hat-shaped cross section perpendicular to a longitudinal direction of the vehicle structural member. In some embodiments, a bending angle between the lateral walls and the flanges is 87° to 94°. In some embodiments, a length of the flanges from the lateral wall is greater than 11 mm.

10 Claims, 9 Drawing Sheets

(56)  References Cited

U.S. PATENT DOCUMENTS

| 2018/0251174 | A1  | 9/2018 | Kamiya |
| 2020/0122663 | A1* | 4/2020 | Nilsson .................. B60R 19/34 |
| 2023/0271649 | A1* | 8/2023 | Suzuki ................ B62D 25/025 |
|              |     |        | 280/784 |

FOREIGN PATENT DOCUMENTS

| JP |   2014125000 | A | * | 7/2014 |
| JP | 2016-000558  | A |   | 1/2016 |
| JP | 2017-007450  | A |   | 1/2017 |
| JP | 2017-047818  | A |   | 3/2017 |
| JP | 2018-075956  | A |   | 5/2018 |

OTHER PUBLICATIONS

English Translation of the International Preliminary Report on Patentability and Written Opinion of PCT/JP2021/029507 (dated Feb. 23, 2023).

Non-English Written Opinion and English/Non-English International Search Report dated Oct. 12, 2021.

Japanese Office Action dated Mar. 14, 2023; English translation provided.

* cited by examiner

←— Front     Rear —→

VEHICLE STRUCTURAL MEMBER

CROSS-REFERENCE TO RELATED APPLICATIONS

The present application is a U.S. National Phase entry of, and claims priority to, PCT Application PCT/JP2021/029507, filed Aug. 10, 2021, which claims priority to Japanese Patent Application No. 2020-135609, filed Aug. 11, 2020, both of which are incorporated herein by reference in their entireties for all purposes.

TECHNICAL FIELD

The present disclosure relates to a vehicle structural member, and, in particular, to a vehicle structural member suitable as a bumper reinforcement installed in a vehicle bumper device.

BACKGROUND

An automobile or other vehicle includes various vehicle structural members. One of them is a structural member having a hat-shaped cross section perpendicular to its longitudinal direction. FIG. 14 shows a conventional vehicle structural member 114 having a hat-shaped cross section. The vehicle structural member 114 generally includes a top wall 120, lateral walls 122, and flanges 124, and is usually press formed. FIG. 14 schematically shows the cross-sectional shape.

The top wall 120 is drawn on the upper side in FIG. 14. The left and right lateral walls 122 extend downward from the edges of the top wall 120 in a diverging manner. The left and right flanges 124 extend outwardly from the corresponding lower ends of the lateral walls 122 through L-shaped bends. The top wall 120 includes a concave bead 126. These features are formed into their desired shapes in a conventional press bending and/or drawing process.

Since the conventional vehicle structural member 114 is press formed, the hat-shaped cross section is provided with draft angles and no negative angles to ensure separation from the press die. The lateral walls 122 extends downward from the edges of the top wall 120. The flanges 124 extend parallel to the top wall 120. The bending angle α1 between the lateral wall 122 and the flanges 124 is typically about 97°. The length of the flanges 124 from the lateral walls 122 is typically less than 11 mm. This is because the space allowed for arrangement of the vehicle structural member 114 is restricted to a relatively narrow space, as shown in FIG. 14 in the imaginary bounding box X of two-dot chain lines, by other structural members arranged around it.

A typical example of such a vehicle structural member 114 is a bumper reinforcement 114 of a vehicle bumper device (see Japanese Patent Application Publications 2017-47818 and 2008-542094). Since the bumper reinforcement 114 of the vehicle bumper device is a structural member that receives an impact load in the event of a vehicle collision, it requires bending strength.

The bending strength of the bumper reinforcement 114, which is a vehicle structural member, is generally evaluated by the three-point bending method. FIGS. 12 and 13 show how the evaluation by the three-point bending method is performed. FIG. 12 shows the bumper reinforcement 114 before a load is applied, while FIG. 13 shows the same after the load is applied. In the evaluation by the three-point bending method, as shown in FIG. 12, the elongated bumper reinforcement 114 is supported by supporting members 118 placed at the positions where the bumper reinforcement 114 would be supported in a vehicle (i.e. at the positions corresponding to the bumper support structures 18 (see FIG. 2)). An impactor 150 is then allowed to collide with the bumper reinforcement 114 from above at its center, and the reaction force received by the impactor 150 during this process is measured. The spacing between the support members 118 is, for example, 1000 mm, and the speed of the impactor 150 is, for example, 10 km/h. Then, as shown in FIG. 13, the bumper reinforcement 114 subjected to the load from the impactor 150 bends downward. The bending strength of the bumper reinforcement 114 is evaluated by measuring the reaction force received by the impactor 150 during this deformation.

Typically, results of such an analysis based on CAE (computer aided engineering) are evaluated in a force-stroke diagram, such as shown in FIG. 11. The force-stroke diagram plots the reaction force (kN) versus the downward stroke (mm) of the impactor 150. The force-stroke curve for the conventional bumper reinforcement 114 having the cross-sectional shape described above is shown in FIG. 11 as graph Y.

The larger maximum load and the shorter stroke of the impactor 150 before reaching the maximum load, the higher evaluation of the bending strength of a structural member with a hat-shaped cross section. Various solutions for achieving higher evaluation have been proposed so far.

SUMMARY

As described above, the space for the vehicle structural member of the bumper reinforcement is limited by other structural members arranged adjacent to it. It is therefore not desirable to increase the size of the cross section to improve the bending strength. Increasing the thickness of the structural member increases the weight of the vehicle, which is not desirable in consideration of fuel efficiency.

When press forming is assumed, a possible solution for improving the bending strength without increasing the mass would be the change to a high-strength material; however, this is not desirable because of the problems of formability and cost increase.

It is thus desired to provide a cross section without any negative draft angles in consideration of press forming and with an improved bending strength without changing the sheet thickness and without increasing the mass.

One aspect is a press-formed vehicle structural member, comprising: a top wall; a pair of lateral walls extending from opposite edges of the top wall in a broadening manner; and a pair of flanges bending outwardly from edges of the lateral walls, wherein the vehicle structural member has a hat-shaped cross section perpendicular to a longitudinal direction of the vehicle structural member, wherein a bending angle between the lateral walls and the flanges is 87° to 94°.

Another aspect is a press-formed vehicle structural member, comprising: a top wall; a pair of lateral walls extending from opposite edges of the top wall in a broadening manner; and a pair of flanges bending outwardly from edges of the lateral walls, wherein the vehicle structural member has a hat-shaped cross section perpendicular to a longitudinal direction of the vehicle structural member, wherein a length of the flanges from the lateral wall is greater than 11 mm.

Yet another aspect is a press-formed vehicle structural member, comprising: a top wall; a pair of lateral walls extending from opposite edges of the top wall in a broadening manner; and a pair of flanges bending outwardly from edges of the lateral walls, wherein the vehicle structural member has a hat-shaped cross section perpendicular to a longitudinal direction of the vehicle structural member, wherein a bending angle between the lateral wall and the flanges is 87° to 94°, and wherein a length of the flanges from the lateral wall is greater than 11 mm.

In some embodiments, the top wall has a cross-sectional width gradually narrowing from longitudinal ends to a center of the vehicle structural member, and the flanges have a cross-sectional width gradually widening from the longitudinal ends to the center of the vehicle structural member.

In some embodiments, the vehicle structural member further comprises a concave bead formed in the top wall, wherein the cross-sectional width of the concave bead of the top wall and the cross-sectional width of the flange are varied in an inverse relationship along a longitudinal direction of the vehicle structural member.

In some embodiments, the vehicle structural member is a bumper reinforcement in a vehicle bumper device.

BRIEF DESCRIPTIONS OF THE DRAWINGS

DETAILED DISCLOSURE

Figure 1:
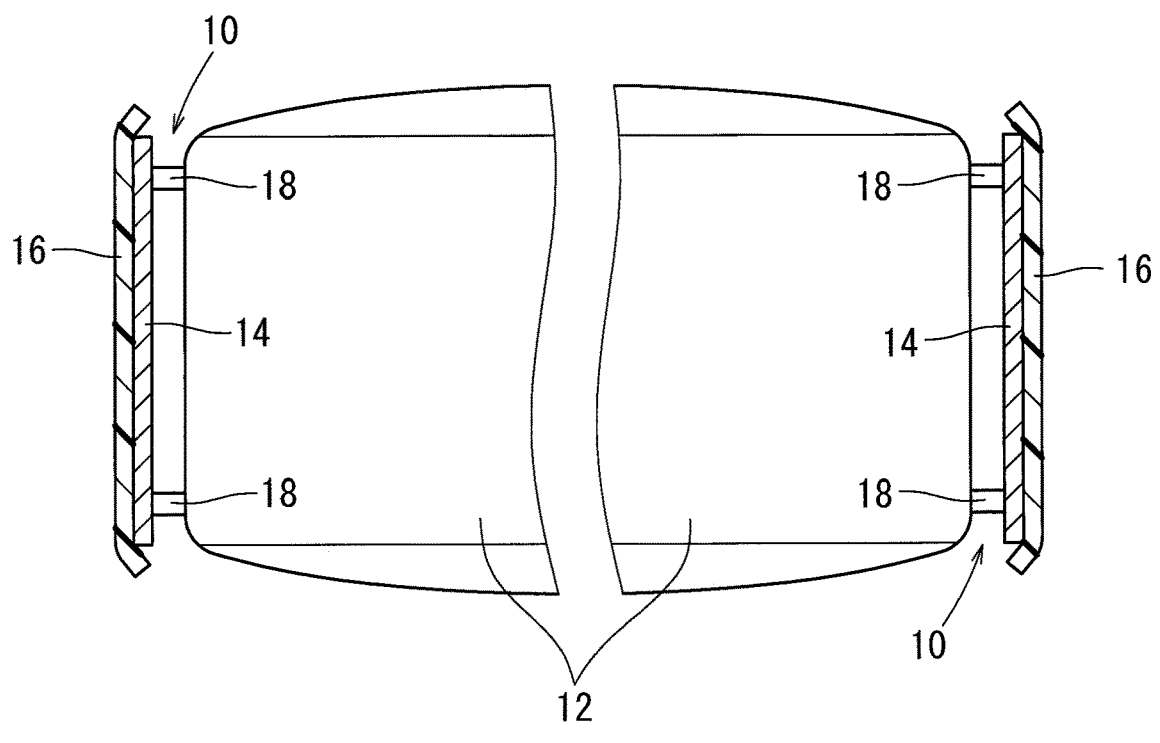
FIG. 1 is a schematic view of a bumper device arranged in relation to an automobile body.

Embodiments of the present disclosure will be described below with reference to the drawings. In one embodiment, the vehicle structural member is a bumper reinforcement installed in a bumper device of a automobile or other vehicle. Unless otherwise specified, directions such as left and right, up and down, and front and back in the following descriptions indicate the directions in the drawing to which reference is made. Where similar features positioned on the left and right should be distinguished, the feature on the right side is indicated by adding a letter R to the end of the reference numeral, and the feature on the left side is indicated by adding a letter L to the end of the reference numeral.

<Bumper Device and Bumper Reinforcement>

First of all, the arrangement and configuration of a vehicle bumper device 10 including a bumper reinforcement 14, which is the vehicle structural member, will be described. FIG. 1 shows the position of the bumper device 10 in an automobile. The bumper device 10 extends generally along the width direction of the vehicle body 12 in the front and rear of the vehicle body 12.

The bumper device 10 includes an elongated bumper reinforcement 14, a bumper cover 16, and bumper support structures 18. The bumper reinforcement 14 is provided as a core member responsible for strength of the bumper device 10. The bumper cover 16 fully covers the bumper reinforcement 14. The bumper cover 16 is positioned at the outermost portion of the bumper device 10 and is designed in consideration of appearance. Typically, the bumper cover 16 is made of plastic, which is a suitable material for forming designed surfaces.

The bumper support structures 18 are disposed between frame members of the vehicle body 12 (not shown in FIG. 1 but shown in FIG. 9 to be discussed later with reference numerals 36) and the bumper reinforcement 14, at the opposite ends of the bumper reinforcement 14 in the longitudinal direction (or the width direction of the vehicle body). The impact load received by the bumper reinforcement 14 is transferred by the bumper support structure 18 to the vehicle body 12 and then supported by the vehicle body 12. In the following, the bumper reinforcement 14 will be described as positioned in the front of the vehicle body 12 for illustrative purposes.

Figure 2:
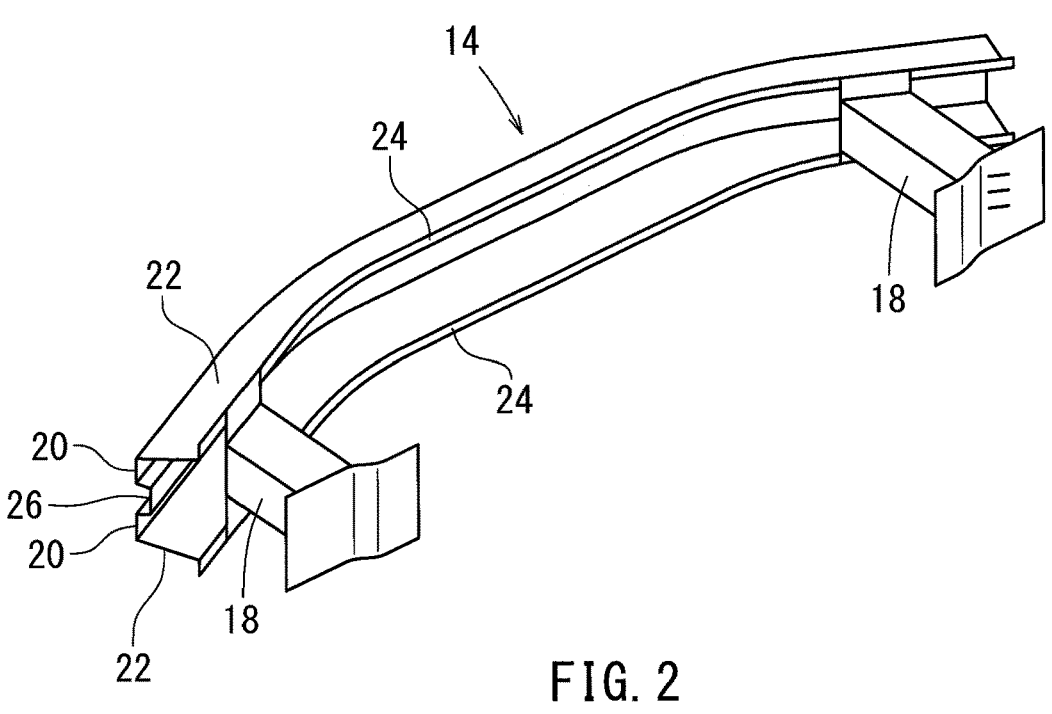
FIG. 2 is a perspective view of a bumper reinforcement arranged in relation to bumper support structures as seen obliquely from the rear left.

FIG. 2 is a perspective view of the bumper reinforcement 14 and the bumper support structure 18 as seen obliquely from the rear left to show their relative positions. When the bumper device 10 configured as shown in FIG. 1 is impacted at its center due to a frontal collision of the automobile, the impact load is first received by the bumper cover 16 and then by the bumper reinforcement 14. The load on the bumper reinforcement 14 is supported by the vehicle body 12 through the bumper support structures 18 positioned at the ends of the bumper reinforcement 14.

The shape of the cross section perpendicular to the longitudinal direction of the bumper reinforcement 14 will now be described. The bumper reinforcement 14 is formed to have a generally hat-shaped cross section. The hat-shaped cross section comprises a top wall 20, lateral walls 22, and flanges 24L, 24R, formed by press forming. The press forming comprises bending and/or drawing, as is well known. The hat-shaped cross section is therefore shaped without any negative draft angles in consideration of the press forming.

Figure 3:
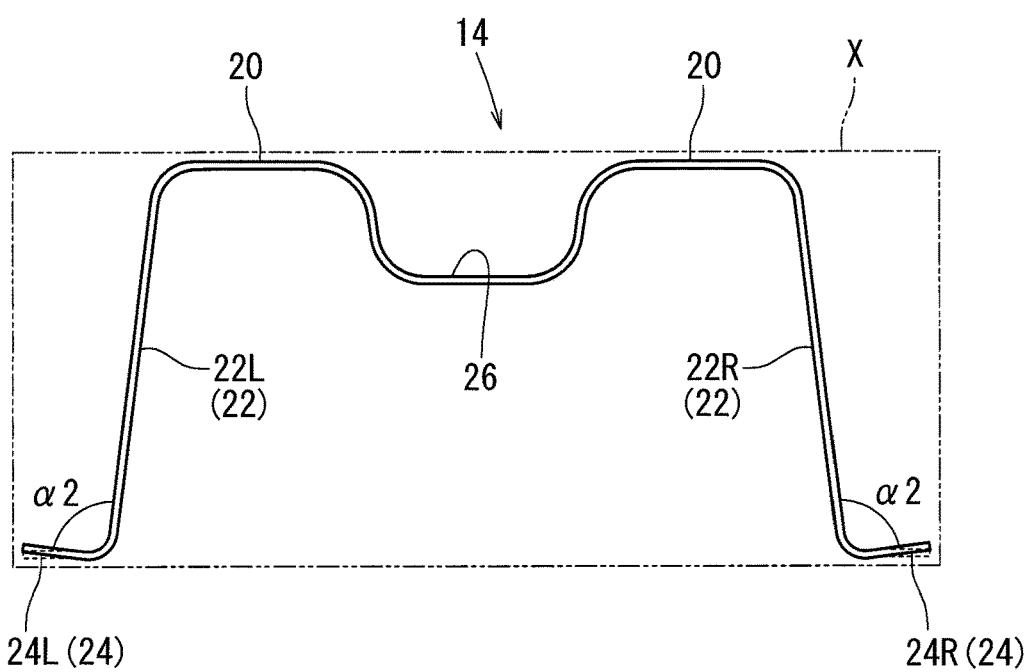
FIG. 3 is a schematic view of a hat-shaped cross section according to one embodiment.

In one embodiment, the hat shape may be as shown in FIG. 3. The hat-shaped cross section includes a top wall 20, left and right flanges 24L, 24R, and left and right lateral walls 22L, 22R extending between the top wall 20 and the flanges 24L, 24R, respectively. The lateral walls 22L, 22R extend downwardly from the opposite edges of the top wall 20. The left and right lateral walls 22L, 22R are more spaced apart as they go downward. For example, as shown in FIG. 3, they form a trapezoidal shape that does not include any negative draft angles.

The flanges 24L, 24R extend outwardly in the left-right direction from the lower edges of the associated lateral walls 22L, 22R. The left flange 24L is connected to the lower end of the left lateral wall 22L. The right flange 24R is connected to the right lateral wall 22R.

A normal (i.e., non-tailored blank) steel sheet with a uniform thickness may be used for the bumper reinforcement 14. The top wall 20 may include an elongated concave bead 26 extending in the longitudinal direction and located at the center of the width of the top wall 20 in order to increase the strength of the top wall 20 in terms of the shape.

<Bending Angle of the Flanges>

Figure 14:
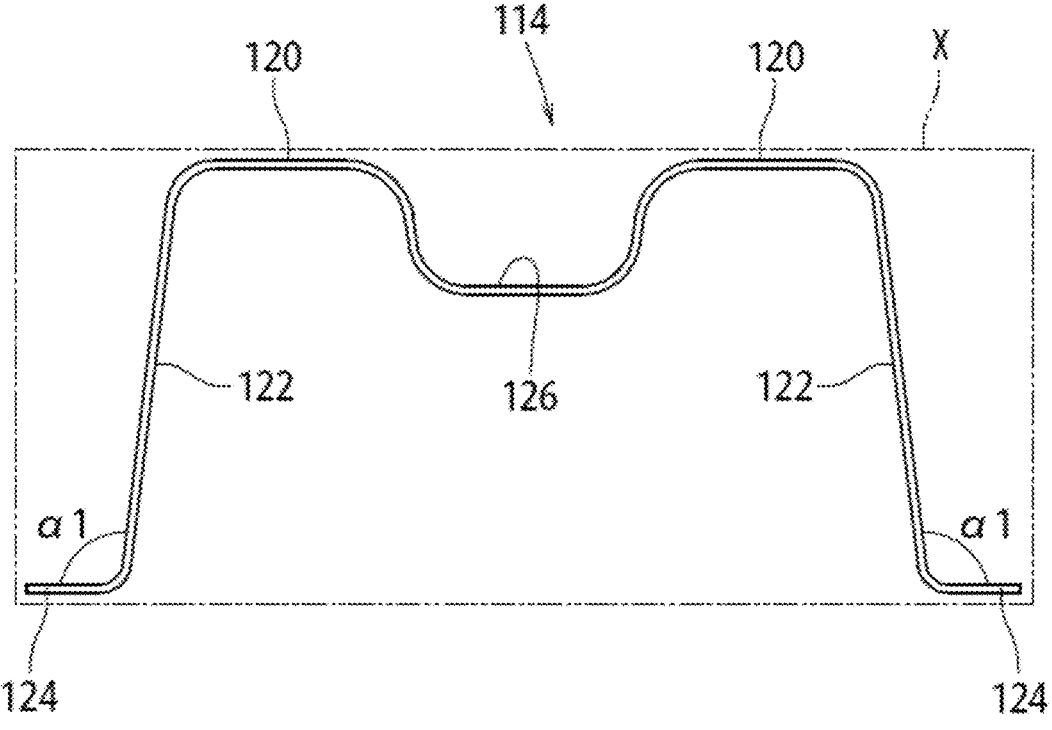
FIG. 14 is a schematic view of a hat-shaped cross section of a conventional vehicle structural member.

In one embodiment, the hat-shaped cross section is formed such that the bending angle $\alpha 2$ between the lateral walls 22L, 22R and the flanges 24L, 24R is a right angle (90°). The box X drawn in FIG. 3 in two-dot chain lines, similarly to the box X shown in FIG. 14, represents the restriction of arrangement by the surrounding structural members; the hat-shaped cross section must be within the box X. This is also the case for FIGS. 4 to 6 to be discussed later.

In FIG. 3, dashed lines at the flanges 24L, 24R indicate the flanges of the conventional structure described above drawn relative to the lateral walls 22L, 22R. As can be seen by comparison of the two, the flanges 24L, 24R of the conventional structure are parallel to the top wall 20, indicated in the dashed lines in FIG. 3, so that the bending angle ($\alpha 1$ in FIG. 14) with respect to the lateral walls 22L, 22R is about 97°. On the other hand, in one embodiment, the flanges 24L, 24R are press formed with the bending angle $\alpha 2$ being 87° to 94°. The bending angle $\alpha 2$ can be, for example, 90° (a right angle), as shown in FIG. 3. The flanges 24L, 24R are thus not parallel to the top wall 20.

Figure 4:
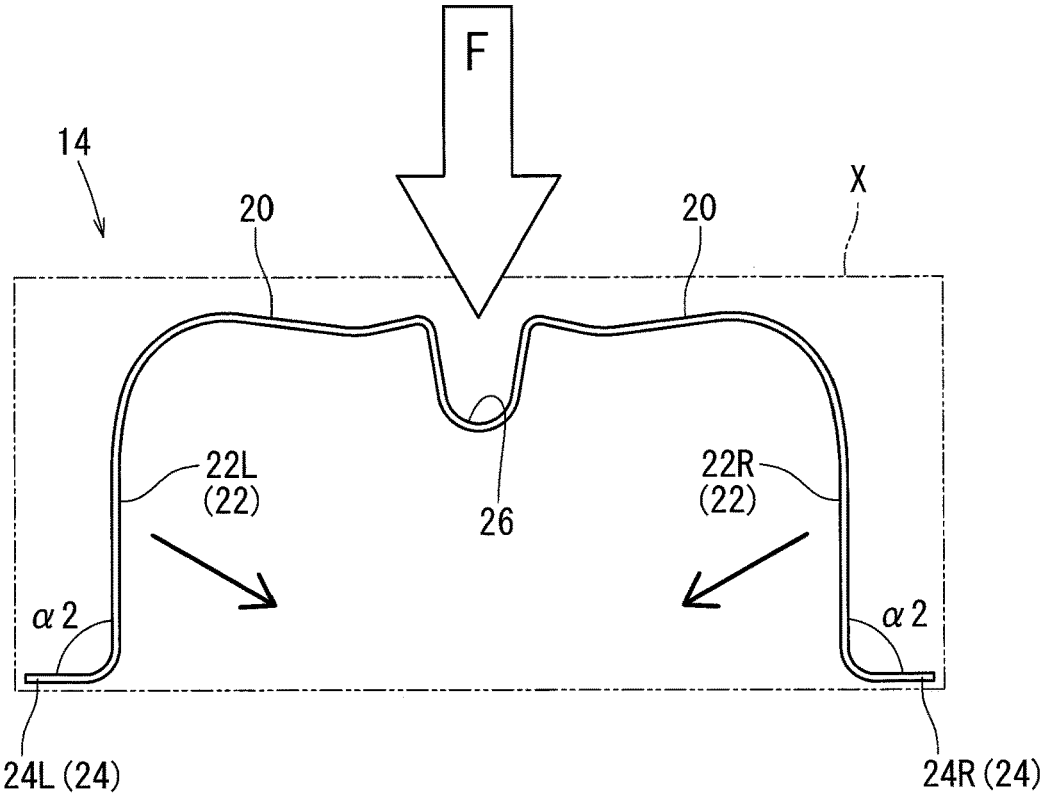
FIG. 4 is a schematic view of the hat-shaped cross section of FIG. 3 deformed inwardly.
Figure 12:
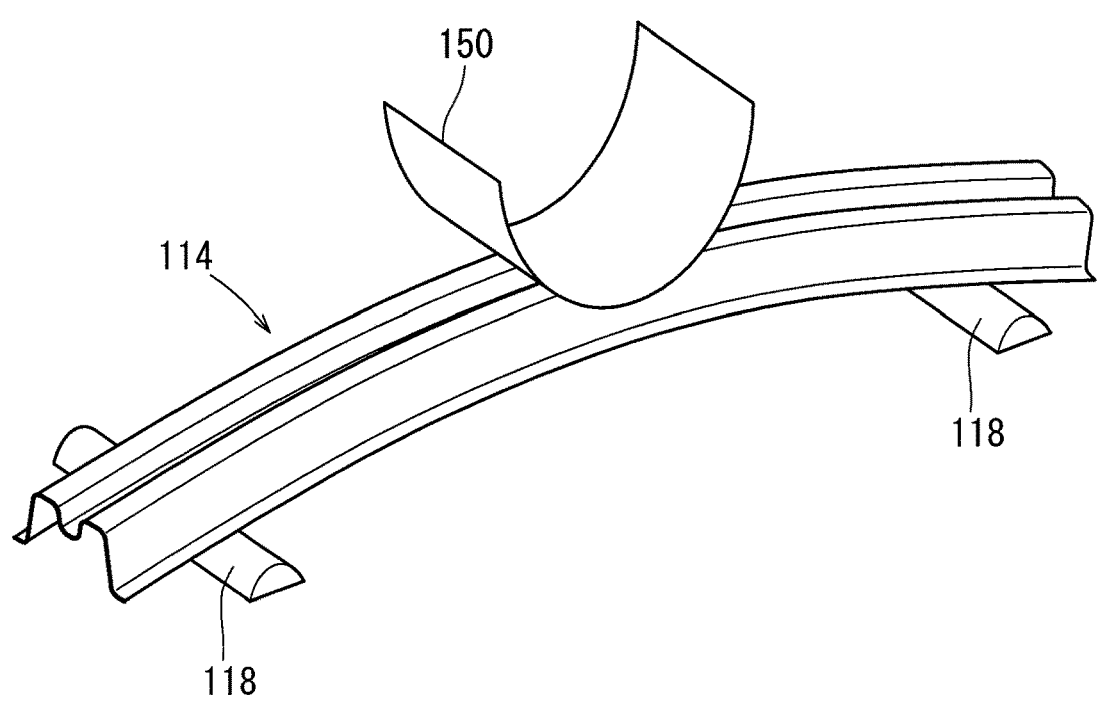
FIG. 12 is a perspective view of the bumper reinforcement before application of a load in a three-point bending test.
Figure 13:
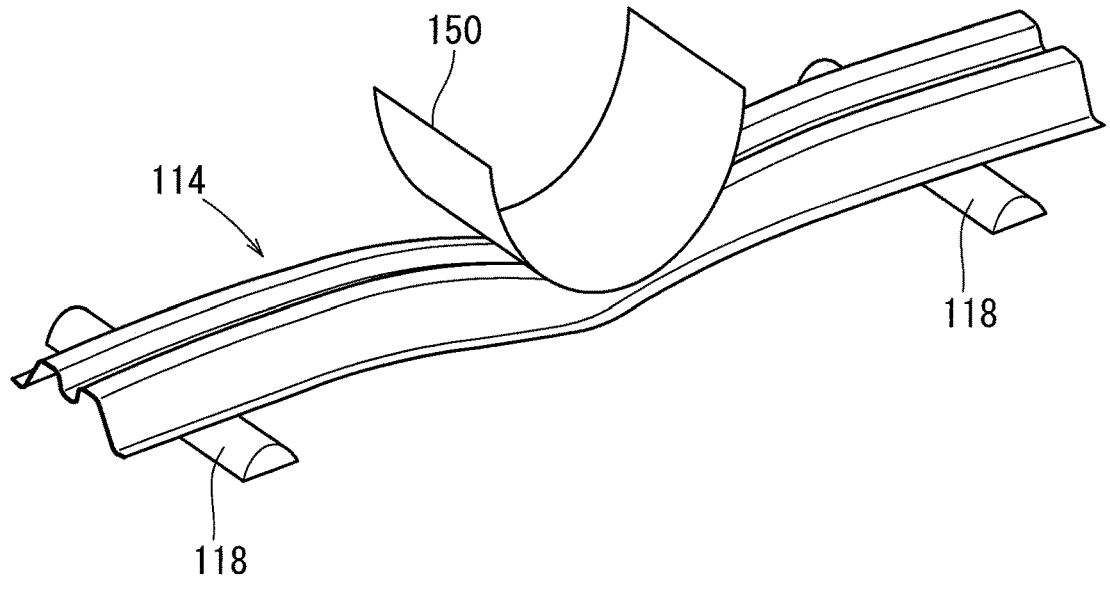
FIG. 13 is a perspective view of the bumper reinforcement deformed by the impact load in the three-point bending test.

FIG. 4 shows how the bumper reinforcement 14 shown in FIG. 3 is deformed into a hat-shaped cross section when the bumper reinforcement 14 is subjected to three-point bending by computer simulation (see FIGS. 12 and 13). When an impact load F is applied to the center of the top wall 20, the lateral walls 22L, 22R fall inward. The bending angle $\alpha 2$ between the lateral walls 22L, 22R and the flanges 24L, 24R remains at the right angle during this inward fall, even when the lateral walls 22L, 22R become perpendicular to the top wall 20 as seen in FIG. 4. This means that the flanges 24L, 24R bear the impact load F in perpendicular positions to the direction of the load F when the lateral walls 22L, 22R fall inward to become vertical, forming a right angle with respect to the flanges 24L, 24R. This leads to an improved bending strength.

The result of the three-point bending of the hat-shaped cross section shown in FIG. 3 is shown by graph H1 in the force-stroke diagram of Fig. According to graph H1, it can be seen that the maximum load of this embodiment is larger than the graph Y, the result of three-point bending of a conventional hat-shaped cross section.

<Modification of the Hat-Shaped Cross Section>

Figure 5:
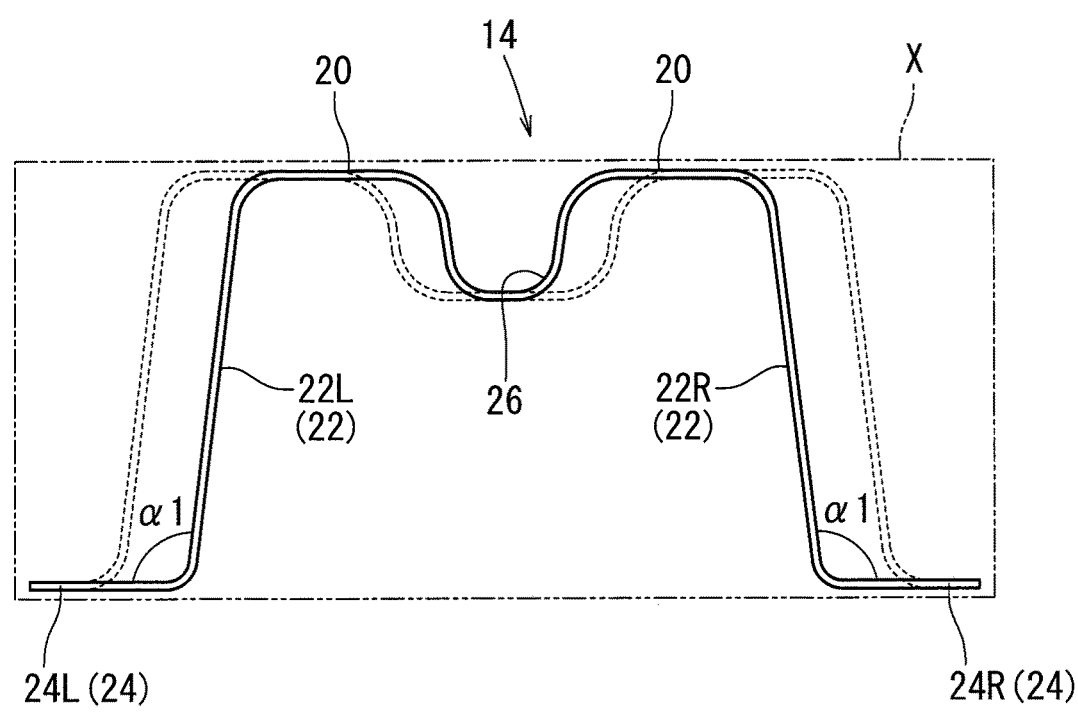
FIG. 5 is a schematic view of a hat-shaped cross section according to another embodiment.

Referring to FIG. 5, in another embodiment, the hat-shaped cross section can be formed such that the length of the flanges 24L, 24R is longer than 11 mm. In a specific embodiment, the length of the flanges 24L, 24R is 21 mm, which is 10 mm longer than the conventional structure. The length of the flanges 24L, 24R is preferably longer than 11 mm and less than or equal to 30 mm.

Since, as described above, the flanges 24L, 24R are formed long, the hat-shaped cross section disposed within the box X drawn in the two-dot chain line in FIG. 5. is formed short. A conventional hat-shaped cross section is shown in a dashed line. As can be seen from the difference indicated by the dashed line and the solid line, the reduction in the width of the top wall 20 in this embodiment is absorbed by the reduction of the width of the conventional concave bead 26 or the width of the top wall 20.

The extended length, which is longer than 11 mm as described above, of the flanges 24L, 24R in the hat-shaped cross section results in a reduced movement of the edges of the flanges, which is likely to be displaced the most, when the hat-shaped cross section collapses inward under a load. This means the inward collapse of the lateral walls 22L, 22R is reduced and thus the bending strength is improved.

Figure 11:
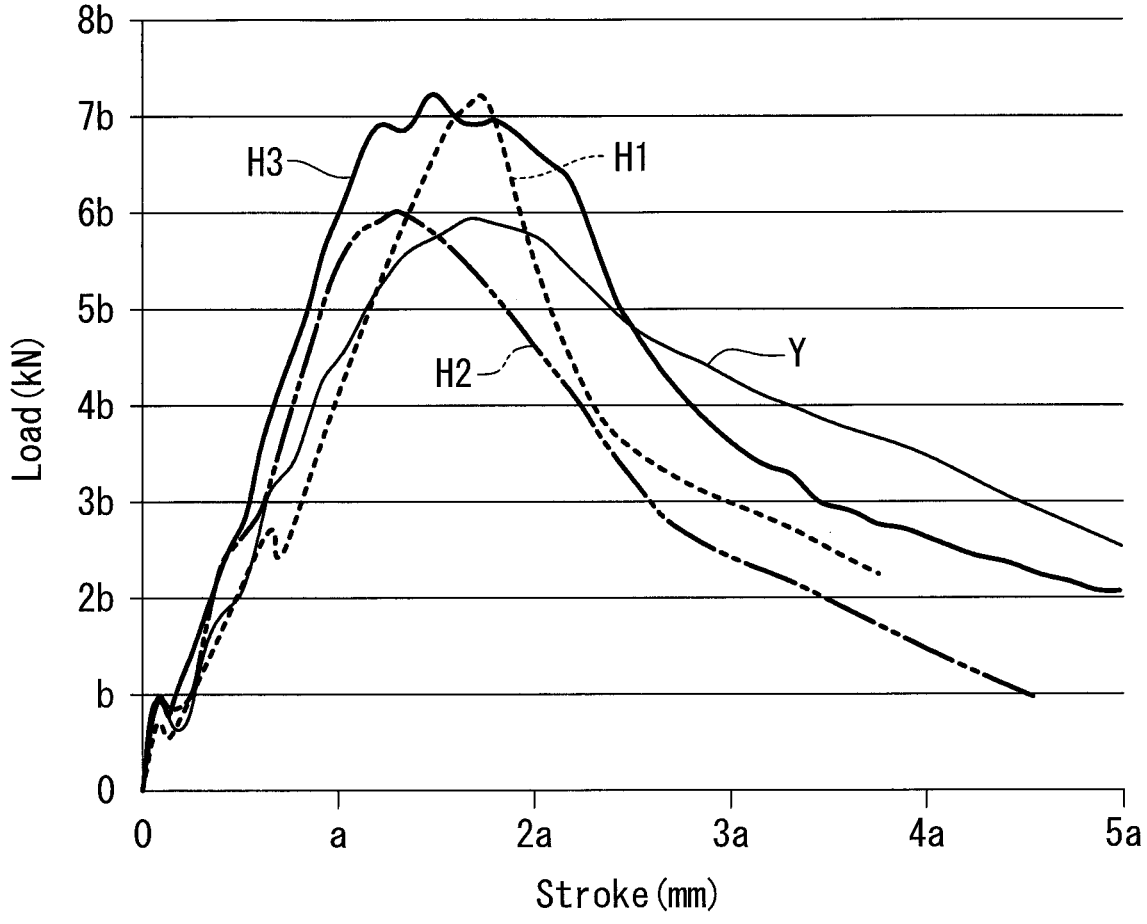
FIG. 11 is a force-stroke diagram showing the computer simulation results of the three-point bending method.

The result of the three-point bending of the hat-shaped cross section of the present embodiment is shown in the force-stroke diagram of FIG. 11 as graph H2. It can be seen that the rise of graph H2 toward the maximum load is faster than graph Y, the result of the conventional hat-shaped cross section.

<Further Modification of the Hat-Shaped Cross Section>

Figure 6:
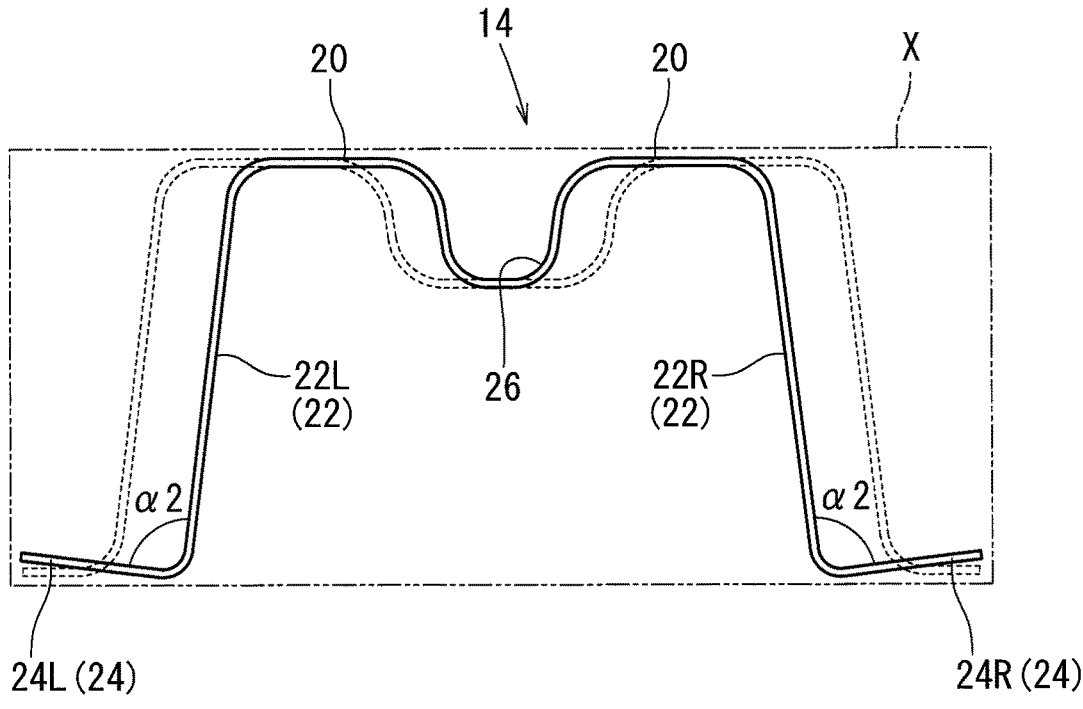
FIG. 6 is a schematic view of a hat-shaped cross section according to a still another embodiment.

Referring to FIG. 6, in a yet another embodiment, the hat-shaped cross section may have a bending angle $\alpha 2$ of 87° to 94° between the lateral walls 22L, 22R and the flanges 24L, 24R as well as the length of the flanges 24L, 24R is longer than 11 mm. That is, the hat-shaped cross section of this embodiment is a combination of the embodiments of FIGS. 3 and 5 described above. The bending angle $\alpha 2$ can be, for example, 90° (a right angle), but is not limited to this.

FIG. 6 shows the hat-shaped cross section in a solid line together with a conventional hat-shaped cross section in a broken line, fitted within the box X. It can be clearly seen from the difference between the two hat-shaped cross sections shown in the solid and broken lines that in the present embodiment the bending angle $\alpha 2$ between the lateral walls 22L, 22R and the flanges 24L, 24R is a right angle, and the length of the flanges 24L, 24R is longer than that of the conventional structure.

Since the configuration of the hat-shaped cross section of the present embodiment is a combination of the embodiments described above referring to FIGS. 3 and 5, the advantages of those embodiments are synergized to improve bending strength. The result of a computer simulation of the present embodiment shown in FIG. 6 is shown in the force-stroke diagram of FIG. 11 as graph H3. According to graph H3, the maximum load is larger, as in the embodiment of FIG. 3 (graph H1), compared to graph Y, which is the result of the conventional hat-shaped cross section. The rise of the graph before the maximum load is reached is also steeper than in the case of the conventional hat-shaped cross section, as in the embodiment of FIG. 5 (graph H2).

<Variation of the Cross-Sectional Shape Along the Longitudinal Direction of the Bumper Reinforcement>

Figure 7:
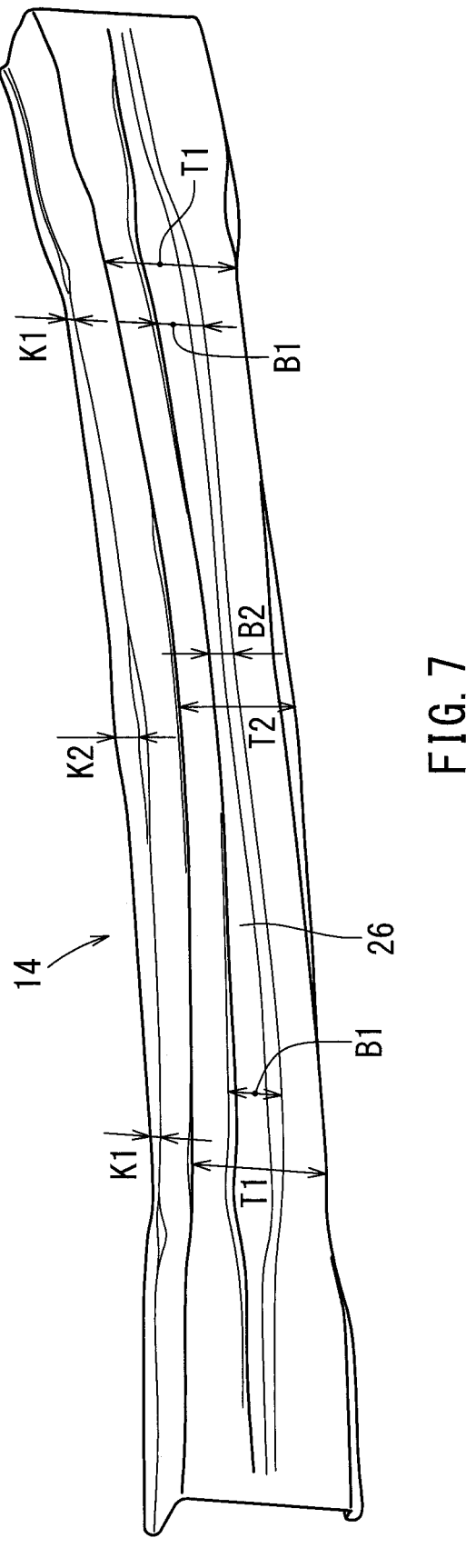
FIG. 7 is an overall perspective view of a varying cross-sectional shape along the longitudinal direction of a bumper reinforcement according to a still another embodiment.
Figure 8:
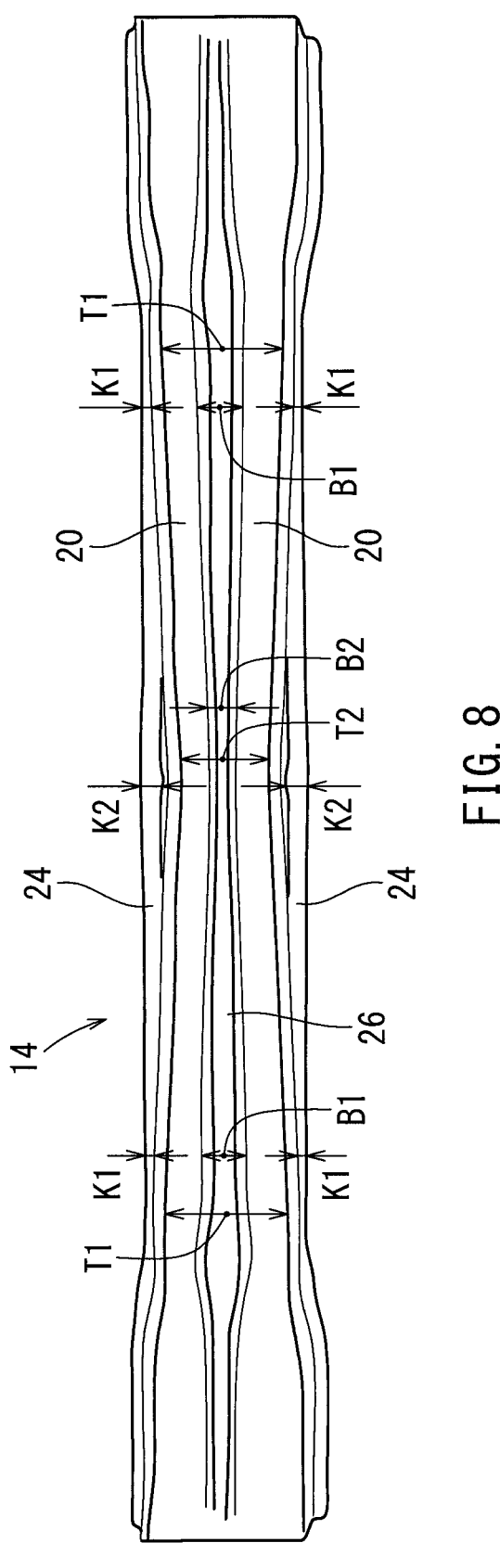
FIG. 8 is an overall plan view of the bumper reinforcement of FIG. 7 as seen from the front.

Referring to FIGS. 7 and 8, in a yet another embodiment, the cross-sectional shape of the bumper reinforcement 14 may be varied along the longitudinal direction. FIG. 7 is a perspective view of the overall bumper reinforcement 14, and FIG. 8 is a plan view of the overall bumper reinforcement 14 as seen from the front.

In this embodiment, the top wall 20 and the flanges 24L, 24R of the bumper reinforcement 14 are gradually varied. The cross-sectional width of the top wall 20 is gradually narrowed from the longitudinal ends of the bumper reinforcement 14 to the center. FIGS. 7 and 8 indicates the width of the top wall 20 as T1 at the ends and T2 at the center; the width gradually decreases from T1 to T2.

The cross-sectional widths of the flanges 24L, 24R gradually widen from the longitudinal ends of the bumper reinforcement 14 to the center. FIGS. 7 and 8 indicates the widths of the flanges 24L, 24R as K1 at their ends and K2 at their centers; the widths gradually increase from K1 to K2.

Also in this embodiment, the hat-shaped cross section can have the same shape as in the embodiments shown in FIGS. 3 to 6 described above. That is, the bending angle α2 between the lateral walls 22L, 22R and the flanges 24L, 24R may be between 87° to 94°, and/or the length of the flanges 24L, 24R may be, entirely or partly, longer than 11 mm.

The top wall 20 includes a concave bead 26, and the cross-sectional width of the concave bead 26 and the cross-sectional width of the flanges 24L, 24R are varied in an inverse relationship along the longitudinal direction of the bumper reinforcement 14. That is, the width of the flanges 24L, 24R is wider in the regions where the width of the concave bead 26 is narrower. Conversely, the width of the flanges 24L, 24R is narrower in the regions where the width of the concave bead 26 is wider. Thereby, the hat-shaped cross sections of the bumper reinforcement 14 can be accommodated in a substantially uniform space over the longitudinal direction.

For example, as shown in FIGS. 7 and 8, toward the ends of the longitudinal direction the width B1 of the concave bead 26 is wider, so that the width K1 of the flanges 24L, 24R is narrower. Toward the center the width B2 of the concave bead 26 is narrower, so that the width K2 of the flanges 24L, 24R is wider.

In the present embodiment, the cross-sectional size of the bumper reinforcement 14 does not increase anywhere along the longitudinal direction, and therefore the bumper reinforcement 14 can be accommodated in the space of a fixed size.

OTHER EMBODIMENTS

Figure 9:
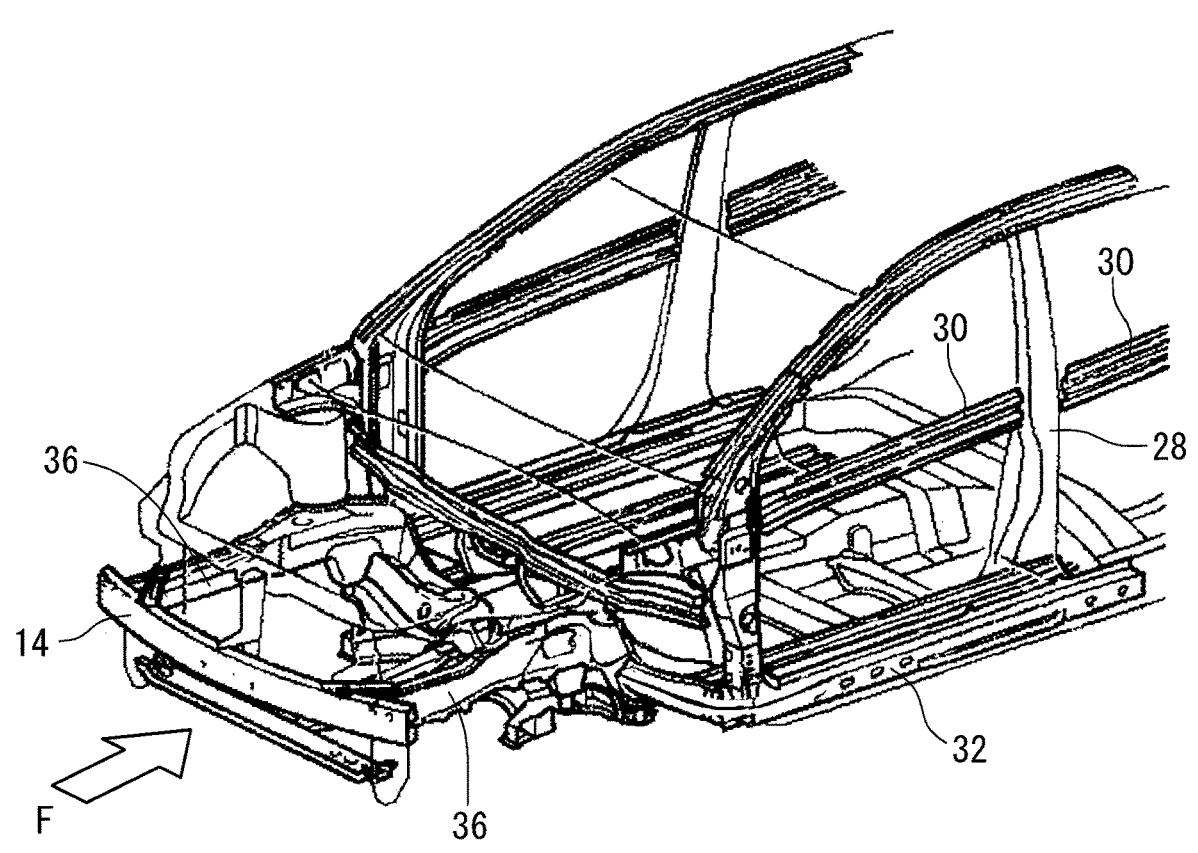
FIG. 9 is a perspective view of the frame of the front section of the automobile body for showing locations for other applications of the vehicle structural member.
Figure 10:
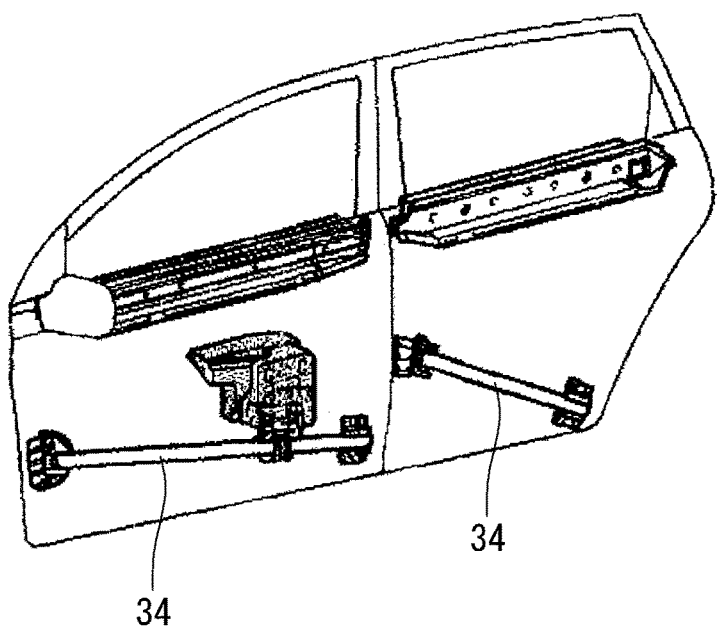
FIG. 10 is a perspective view of the frame of a side of the automobile body for showing a location for another application of the vehicle structural member.

The vehicle structural member in the above embodiments has been described as the bumper reinforcement 14 included in a bumper device 10 of an automobile or other vehicle. In other embodiments, the features of the bumper reinforcement 14 can also be applied to various vehicle structural members such as shown in FIGS. 9 and 10. For example, it is applicable to a center pillar 28, a door belt line reinforcement 30, or a locker outer reinforcement 32 as shown in FIG. 9, or a door side impact protection beam 34 as shown in FIG. 10.

In further embodiments, the features of the embodiments described above can also be applied to a vehicle structural member formed from a tailored blank.

In the above-described embodiments, the depth of the concave bead 26 formed in the top wall 20 has not been mentioned. In various embodiments, the depth may be uniform along the longitudinal direction, or alternatively the depth may vary along the longitudinal direction.

The concave bead 26 has been arranged only at one place in the cross section. In another embodiment, the top wall 20 may include one or more additional shallower beads.

ADVANTAGES OF THE ABOVE-DESCRIBED EMBODIMENTS

In conclusion, some advantages of the above-described embodiments are added below.

In some embodiments, the bending angle between the lateral wall and the flanges of the vehicle structural member is a right angle.

When a load is applied to the top wall and thereby the vertical wall falls inward, this keeps the angle of the flanges to be 90° when the maximum load is reached, i.e. when the vertical walls are aligned in the direction of action of the load. This leads to an improved bending strength as compared to the conventional structure.

In some embodiments, the length of the flanges of the vehicle structural member is longer than 11 mm. This length of the flanges, which is longer than that of conventional flanges, reduces the movement of the edges of the flanges, where the structural member is likely to displace most, when a load is applied to the top wall and thereby the vertical wall falls inward. This leads to an improved bending strength as compared to the conventional structure.

In some embodiments, the bending angle between the lateral wall and the flanges of the vehicle structural member is a right angle, as well as the length of the flanges is longer than 11 mm. This is the combination of the two features described above. As a result, corresponding advantages of these features described above can be obtained at the same time, leading to a further improved bending strength as compared to the conventional structure.

In some embodiments, the cross-sectional width of the top wall gradually narrows from the longitudinal ends to the center, and the cross-sectional width of the flanges gradually widens from the longitudinal ends to the center. Thereby, it is possible to form a space having a constant size without increasing the cross-sectional space in the longitudinal direction of the vehicle structural member.

In some embodiments, the top wall includes a concave bead, and the cross-sectional width of the concave bead of the top wall and the cross-sectional width of the flanges are varied in an inverse relationship along the longitudinal direction of the vehicle structural member.

In some embodiments, the vehicle structural member is suitable for bumper reinforcement in a vehicle bumper system.

While specific embodiments have been described above, the present disclosure is not limited to these embodiments, and those skilled in the art can make various substitutions, changes, and improvements.

I claim:

1. A press-formed vehicle structural member, comprising:
a top wall;
a concave bead formed in the top wall;
a pair of lateral walls extending from opposite edges of the top wall in a broadening manner; and
a pair of flanges bending outwardly from edges of the lateral walls,
wherein the vehicle structural member has a hat-shaped cross section perpendicular to a longitudinal direction of the vehicle structural member,
wherein a bending angle between the lateral walls and the flanges is 87° to 94°,
wherein the flanges are non-parallel to the top wall,
wherein the top wall has a cross-sectional width gradually narrowing from longitudinal ends to a center of the vehicle structural member,
wherein the flanges have a cross-sectional width gradually widening from the longitudinal ends to the center of the vehicle structural member, and
wherein the cross-sectional width of the concave bead of the top wall and the cross-sectional width of the flange are varied in an inverse relationship along a longitudinal direction of the vehicle structural member.

2. A press-formed vehicle structural member, comprising:
a top wall;
a concave bead formed in the top wall;
a pair of lateral walls extending from opposite edges of the top wall in a broadening manner; and

9 a pair of flanges bending outwardly from edges of the lateral walls, wherein the vehicle structural member has a hat-shaped cross section perpendicular to a longitudinal direction of the vehicle structural member, wherein a length of the flanges from the lateral wall is greater than 11 mm, wherein the flanges are non-parallel to the top wall, wherein the top wall has a cross-sectional width gradually narrowing from longitudinal ends to a center of the vehicle structural member, wherein the flanges have a cross-sectional width gradually widening from the longitudinal ends to the center of the vehicle structural member, and wherein the cross-sectional width of the concave bead of the top wall and the cross-sectional width of the flange are varied in an inverse relationship along a longitudinal direction of the vehicle structural member.

3. A press-formed vehicle structural member, comprising:

a top wall;

a concave bead formed in the top wall;

a pair of lateral walls extending from opposite edges of the top wall in a broadening manner; and a pair of flanges bending outwardly from edges of the lateral walls, wherein the vehicle structural member has a hat-shaped cross section perpendicular to a longitudinal direction of the vehicle structural member, wherein a bending angle between the lateral wall and the flanges is 87° to 94°, wherein a length of the flanges from the lateral wall is greater than 11 mm, wherein the flanges are non-parallel to the top wall, wherein the top wall has a cross-sectional width gradually narrowing from longitudinal ends to a center of the vehicle structural member, wherein the flanges have a cross-sectional width gradually widening from the longitudinal ends to the center of the vehicle structural member, and wherein the cross-sectional width of the concave bead of the top wall and the cross-sectional width of the flange are varied in an inverse relationship along a longitudinal direction of the vehicle structural member.

4. The vehicle structural member of claim 1, wherein the vehicle structural member is a bumper reinforcement in a vehicle bumper device.

5. The vehicle structural member of claim 1, wherein each flange projects substantially linearly from the corresponding lateral wall.

6. The vehicle structural member of claim 2, wherein each flange projects substantially linearly from the corresponding lateral wall.

7. The vehicle structural member of claim 3, wherein each flange projects substantially linearly from the corresponding lateral wall.

8. The vehicle structural member of claim 1, wherein a first flange of the pair of flanges projects from a first lateral wall of the pair of lateral walls in a first direction, wherein a second flange of the pair of flanges projects from a second lateral wall of the pair of lateral walls in a second direction, and wherein the first direction and the second direction are non-collinear.

9. The vehicle structural member of claim 2, wherein a first flange of the pair of flanges projects from a first lateral wall of the pair of lateral walls in a first direction, wherein a second flange of the pair of flanges projects from a second lateral wall of the pair of lateral walls in a second direction, and wherein the first direction and the second direction are non-collinear.

10. The vehicle structural member of claim 3, wherein a first flange of the pair of flanges projects from a first lateral wall of the pair of lateral walls in a first direction, wherein a second flange of the pair of flanges projects from a second lateral wall of the pair of lateral walls in a second direction, and wherein the first direction and the second direction are non-collinear.

* * * * *